United States Patent
Ström et al.

(10) Patent No.: US 7,961,185 B2
(45) Date of Patent: Jun. 14, 2011

(54) GRAPHICS PROCESSING APPARATUS, METHODS AND COMPUTER PROGRAM PRODUCTS UTILIZING MINIMUM-DEPTH OCCLUSION CULLING AND ZIG-ZAG TRAVERSAL

(75) Inventors: Jacob Ström, Stockholm (SE); Tomas Akenine-Möller, Göteborg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 824 days.

(21) Appl. No.: 11/848,569

(22) Filed: Aug. 31, 2007

(65) Prior Publication Data

US 2009/0058852 A1   Mar. 5, 2009

Related U.S. Application Data

(63) Continuation of application No. 10/720,042, filed on Nov. 21, 2003, now Pat. No. 7,301,537.

(60) Provisional application No. 60/434,900, filed on Dec. 20, 2002.

(51) Int. Cl.
    *G06T 15/00* (2011.01)
(52) U.S. Cl. ......... 345/422; 345/419; 345/421; 345/608
(58) Field of Classification Search .................. 345/419, 345/420, 422, 608, 421
    See application file for complete search history.

(56) References Cited

U.S. PATENT DOCUMENTS

| | | | | |
|---|---|---|---|---|
| 6,094,200 A  * | 7/2000 | Olsen et al. | ................... | 345/422 |
| 6,204,856 B1 * | 3/2001 | Wood et al. | ................... | 345/608 |
| 6,313,839 B1 * | 11/2001 | Larson | ........................... | 345/422 |
| 6,476,807 B1 * | 11/2002 | Duluk et al. | ................... | 345/421 |
| 6,518,965 B2 * | 2/2003 | Dye et al. | ...................... | 345/419 |
| 6,525,726 B1 * | 2/2003 | Xie et al. | ...................... | 345/421 |
| 7,301,537 B2 * | 11/2007 | Strom et al. | ................... | 345/422 |
| 2004/0119709 A1 | 6/2004 | Strom et al. | | |

FOREIGN PATENT DOCUMENTS

| | | |
|---|---|---|
| JP | H07-210707 A | 8/1995 |
| JP | H09-180000 A | 7/1997 |
| JP | H09-265549 A | 10/1997 |
| JP | 2000-331185 A | 11/2000 |

* cited by examiner

*Primary Examiner* — Phu Nguyen

(57) ABSTRACT

A plurality of rows of tiles is defined in a graphics display field comprising a plurality of rows of pixels, each tile including pixels from at least two rows of pixels. Occlusion flags for respective tiles of a row of tiles for a graphics primitive are set based on whether respective representative depth values for the tiles of the row of tiles meet an occlusion criterion. Pixels in rows of pixels corresponding to the row of tiles are processed for the graphics primitive in a row-by-row manner responsive to the occlusion flags. The processing may include processing rows of pixels in the row of tiles using a zig-zag traversal algorithm.

13 Claims, 6 Drawing Sheets

GRAPHICS PROCESSING APPARATUS, METHODS AND COMPUTER PROGRAM PRODUCTS UTILIZING MINIMUM-DEPTH OCCLUSION CULLING AND ZIG-ZAG TRAVERSAL

RELATED APPLICATION

This application is a continuation of U.S. patent application Ser. No. 10/720,042 filed Nov. 21, 2003, now U.S. Pat. No. 7,301,537, which claims the benefit of U.S. Provisional Application Ser. No. 60/434,900 filed Dec. 20, 2002.

BACKGROUND OF THE INVENTION

1. Technical Field of the Invention

The present invention relates to computer graphics, and more particular, to graphics processing methods, apparatus and computer program products.

2. Description of Related Art

Mobile phones are used all over the world. As they typically are equipped with displays, it is also possible to render images on these devices. It is very likely that this makes the mobile phone the most widespread rendering platform today. However, this type of rendering has mostly been limited to very simple two-dimensional graphics, and it is only recently that three-dimensional graphics has seen the light in this context. Increased interest in mobile graphics can be seen in the activities of upcoming standards, such as Java Specification Request 184 (see, e.g., www.jcp.org) and OpenGL ES for embedded systems (see, e.g., www.khronos.org). Applications that are likely to use three-dimensional Graphics include man-machine interfaces (MMIs), screen savers, maps, animated messages, and, naturally games.

Mobile phones inherently exhibit two characteristics that are drastically different from, for example, PC systems with graphics cards. First of all, they have very small displays, and second, they have very small amounts of resources for rendering. These characteristics will be briefly discussed next.

Existing mobile phones with color displays often have a resolution of [176–320]×[144–240], i.e., the displays are very small. The QCIF standard defines a resolution of 176× 144, and the QVGA standard uses 320×240. While larger resolutions, such as 1024×768, will appear on mobile phones as well, it is quite likely that this only will be on the very high-end of mobile phones, and thus not available to most people. In addition to that, such large resolutions will probably consume more energy, which can decrease battery lifetime. Therefore, it can be expected that the smaller resolutions, such as QCIF and QVGA, will dominate.

In terms of number of colors on the display anything from 256 to 65,536 colors are common. In addition to small resolution, the user often holds the display close to the eyes, which makes the average eye-to-pixel angle large in comparison to that of a PC system. In conclusion, these display conditions imply that every pixel on a mobile phone should ultimately be rendered with higher quality than on a PC system. This is sometimes called the "inverse screen size rendering quality law."

There are several reasons for a mobile phone to have small resources. Because they typically are powered by rechargeable batteries, any type of rendering should preferably use as little energy as possible. Moreover, battery technology typically does not improve at the rate of Moore's law. Also, external memory accesses are most often the operation in a computer system that uses the most energy. This means that bandwidth resources should be used with great care, and that peak bandwidth is extremely limited in the first place.

To keep costs per device low, mobile phones are generally equipped with very little memory, and little chip area is dedicated to graphics operations. Little available bandwidth, little amount of chip area, and small amounts of memory all help to keep the price per device low, but more importantly, these factors also, in the majority of cases, contribute to using less energy than a system with more resources. Typical examples of real mobile phone data is: 1) one or a half 32-bit memory access per clock cycle. 2) CPUs with 10-200 MHz, and 3) 1-16 MB of reasonably fast memory.

The real-time rendering of three-dimensional graphics has a number of appealing applications on mobile terminals, including games, man-machine interfaces, messaging and m-commerce. Because three-dimensional rendering typically is a computationally expensive task, dedicated hardware often must be built to reach sufficient performance. Innovative ways of lowering the complexity and bandwidth usage of this hardware architecture are thus of great importance.

In a large number of cases, a z-buffer (depth buffer) is used to resolve visibility. This is typically done because triangles can generally be drawn in any order. Therefore, the z-buffer stores a scaled distance from the eye to the triangle, and if a subsequent triangle is farther away than the contents of the z-buffer, then the color and the z-buffer are not overdrawn.

Still, this also implies that the graphics system is not very clever, as a pixel can be overdrawn several times. And even if a pixel is overwritten several times, only one geometric primitive (triangle) may be visible in the end. An analog is painting on a canvas, where the bottommost paint layers will be obscured by the frontmost paint layers. For a graphics system, the same holds, but with the exception that paint can be drawn in any order.

It is also important to realize that for a mobile platform, it is generally desirable that the bandwidth usage to main memory should be reduced as much as possible, because such memory accesses use up a significant portion of the energy, which typically is a scarce resource.

There are several graphics cards (NVIDIA Geforce3 and up, and ATI Radeon) that use a form of occlusion culling today. The screen is divided into, say, 8×8 regions (called tiles), and for each tile, the maximum of the z-values, zmax, in the z-buffer for that tile is stored in a cache-memory (fast and not energy-expensive). When triangles are rendered, all pixels are visited in a tile before turning to the next tile, and when a new tile is encountered the minimum z-value, zmin, on the triangle inside that tile is computed (or some cheaper less accurate method can be used to overestimate the minimum z-value). If zmin is larger than the tile's zmax, then that triangle that we currently render is occluded (obstructed), and we typically do not need to process that tile for that triangle further. If the tile is not occluded, then the pixels inside the tile are processed as usual, i.e., the pixels are tested for inclusion in the triangle, z-testing occurs, and texturing, etc.

U.S. Pat. No. 6,421,764 to Morein, "Method and apparatus for efficient clearing of memory", (described in Akenine-Möller Tomas, and Eric Haines, *Real-Time Rendering*, 2nd edition, June 2002, pp. 694-697) describes a way for effective clearing of memory. Instead of clearing the z-buffer (for example), he sets a flag for each tile (e.g., a 8×8 region). Later, when that tile is accessed for the first time, reading of the pixels in that block can be avoided, and instead a "cleared value" is read from a fast on-chip memory since the flag is set. When the tile is written to for the first time, the flag is unset. This way, only a fraction of the memory may be touched during clearing, which can save energy and bandwidth.

It is generally desirable that the bandwidth usage to main memory be kept as low as possible, in order to get better performance and to save (battery) power. To interpolate texture (image) data, z-coordinates, etc., over the triangle, one may need to store several parameters, and the set of parameters for a particular pixel is called a context. This context can be updated when one moves to another pixel. As more contexts are used, the more expensive the solution in terms of gates in hardware can become.

It is generally desirable that the number of gates be kept as low as possible in order to get a cost-efficient solution. Some currently known methods to visit all the pixels in a tile before moving on to the next tile need 4 or 5 whole contexts (confer McCormack, Joel, and Robert McNamara, "Tiled Polygon Traversal Using Half-Plane Edge Functions", Workshop on Graphics Hardware, pp. 15-22, August 2000, and also Kelleher. Brian. "Pixel Vision Architecture". Digital Systems Research Center, no. 1998-013. October 1998). This may be too expensive for a mobile platform. It should also be noted that it is possible to use the z-max techniques, but a potential problem with these is that it may be expensive to update the z-max after a triangle has been rendered, because all z-values in the entire tile need to be read before z-max can be updated. Current solutions that use z-max solve this by reading the entire block of z-values. This is possible because they typically have much higher bandwidth to the main memory than a mobile platform has, and they can, thus, afford that type of solution.

In general, there has not been much published on low-cost architectures where the entire system is described. Two notable exceptions are Neon (described in McCormack, Joel, and Robert McNamara, "Tiled Polygon Traversal Using Half-Plane Edge Functions", Workshop on Graphics Hardware, pp. 15-22, August 2000), and the PixelVision architecture (described in Kelleher, Brian, "Pixel Vision architecture", Digital Systems Research Center, no. 1998-013, October 1998). Imagination Technologies has a system called MBX, and this architecture is tile-based, and therefore the z-buffer, back buffer, and stencil buffer only need to be the size of a tile, e.g., 32×16 pixels. This memory is often implemented in fast on-chip memory. Initially, one pass needs to sort all geometry into the tiles, and this requires memory and memory bandwidth as well. When this sorting is finished, the geometry in each tile is rasterized. During rasterization, visibility is first resolved, and then texturing and shading is performed only on visible fragments. This is called deferred shading. To keep rasterization of tiles going in parallel with tile sorting, two buffers per tile are needed. There is not much information on the MBX architecture, and therefore, it is not clear what the gains really are, besides the avoidance of memory for buffers. Is it quite obvious that this architecture gives savings in terms of energy. However, it has not been documented how much.

For rasterization of polygons with subpixel accuracy, one can use a modified Bresenham algorithm, as described in Lathrop, O., Kirk, D., and Voorhies, "Accurate rendering by subpixel addressing," *IEEE Computer Graphics and Applications* 10, 5 (September 1990), pp. 45-53. An often used alternative is to use edge functions as described in Pineda, J., "A parallel algorithm for polygon rasterization." *Proceedings of SIGGRAPH* 1988, ACM, pp. 17-20 (1988), where the region inside a triangle is described as the logical intersection of the positive half-spaces of the triangle edges. Then, different strategies can be used to find the pixels inside the triangle. This is called traversal. Depending on how efficient these strategies are, different number of contexts (interpolation parameters, etc) are required during traversal. Each context usually costs considerably in terms of gates.

FIG. 1 shows traversal of a triangle according to Pineda's zigzag traversal scheme. The pixels marked with light gray or dark gray are pixels that are touched by the traversal scheme. The pixels marked with dark gray are the ones that the traversal algorithm finds to be inside the triangle. The path that the zigzag traversal algorithm takes is shown as an arrowed path. Basically, the triangle is traversed right-to-left on the first scanline, until we are outside the triangle. Then we go one step up. If we are then inside the triangle, we need to continue in the same direction until we are outside the triangle. This is called backtracking. When we are outside the triangle, the traversal direction is reversed and we start rasterizing the current scanline, this time from left-to-right. When we get outside the triangle, we take another step up, and so it continues.

An example is shown in FIG. 1. On the bottom-most scanline, one pixel is set, but the next one to the left is outside the triangle. This means that we should go one step up. After this step, we are inside the triangle, and we must backtrack, i.e., continue to go left, until we are outside of the triangle. After one pixel we are outside the triangle, and we can reverse the traversal direction (from right-to-left to left-to-right) and start rasterizing the second scan line. We find two pixels that should be inside the triangle, and after this we are outside the triangle and must go one step up. This time we are already outside the triangle and we do not need to backtrack. Hence, we can reverse the traversal direction and start rasterizing the third scanline, and so it goes on.

Every time we encounter a pixel that is found to be inside the triangle, we need to find out whether or not we should draw it. Thus we calculate the z-value of the triangle in that point, here called z-tri (x,y), where (x,y) are the coordinates of the point. Then we fetch the z-value from the z-buffer for that pixel, called z-buf (x,y). If z-tri (x,y)>=z-buf (x,y), nothing happens. However, if z-tri (x,y)<z-buf (x,y), then we should draw the pixel, and also update the z-buffer with the z-tri (x,y) value. In pseudo code it can look as follows:

```
calculate z-tri (x,y)
fetch z-buf (x,y) from z-buffer
if (z-tri (x,y) < z-buf (x,y))
{
    write z-tri (x,y) to z-buffer
    write color in color-buffer
}
```

Note that the if statement can be changed to an arbitrary depth test if (depthtest (z-tri(x,y), z-buf (x,y)). To increase the level of utilization of coherence, and for simple occlusion culling algorithms, graphics hardware often traverses the pixels that a triangle covers in a tiled fashion (see Kelleher. Brian, "Pixel Vision architecture". Digital Systems Research Center, no. 1998-013, October 1998; McCormack, Joel, and Robert McNamara, "Tiled Polygon Traversal Using Half-Plane Edge Functions", Workshop on Graphics Hardware, pp. 15-22, August 2000; U.S. Pat. No. 6,421,764 to Morein). This means that all pixels inside a tile, say an 8×8 region, are visited before moving on to another tile. Different traversal strategies are needed for this, and these cost in terms of numbers of contexts that must be stored. For example, McCormack and McNamara describe a tiled traversal algorithm that requires one more context than the corresponding non-tiled traversal. In total, they need four contexts for the tiled version.

The hierarchical z-buffer algorithm uses a z-pyramid, where each pixel in each level in the pyramid store the maximum of its four children's z-values (in the level below) as described in Greene, N., Kass, M., and Miller, G., "Hierarchical z-buffer visibility," *Proceedings of SIGGRAPH* 1993, ACM, pp. 231-238 (1993); U.S. Pat. Nos. 5,600,763 and 5,579,455. Thus, at the tip of the pyramid, the maximum of all z-values over the entire screen is stored. This pyramid is used to perform occlusion culling. When rendering a group of geometry, the bounding volume of the group is scan-converted and tested against appropriate levels in the buffer to determine whether the group is visible. This algorithm is highly efficient when implemented in software, however, there still does not exist a full-blown hardware implementation. However, commodity graphics hardware often have a simpler form of occlusion culling. Morein, S., "ATI radeon Hyperz technology", *Workshop on Graphics Hardware, Hot3D Proceedings*, ACM SIGGRAPH/Eurographics.Morein (2000) describes a technique, where each tile stores the maximum, $z_{max}$, of the z-values inside a tile, which can be e.g., 8×8 pixels. During traversal of a triangle, a test is performed when a new tile is visited that determines if the "smallest" z-value of the triangle is larger than $z_{max}$ of the corresponding tile. If so, that tile is skipped, and otherwise that tile is rendered as usual. Note that, to update $z_{max}$, all the z-values of the tile must be read, which can be expensive.

SUMMARY

According to some embodiments of the present invention, a plurality of rows of tiles is defined in a graphics display field comprising a plurality of rows of pixels, each tile including pixels from at least two rows of pixels. Occlusion flags for respective tiles of a row of tiles for a graphics primitive are set (e.g., valued to show non-occlusion, possible occlusion, or other occlusion state) based on whether respective representative depth values for the tiles of the row of tiles meet an occlusion criterion. Pixels in rows of pixels corresponding to the row of tiles are processed for the graphics primitive in a row-by-row manner responsive to the occlusion flags. The processing may include processing a portion of the pixels in a first tile of the row of tiles responsive to the occlusion flags, and then processing pixels in a second tile of the row of tiles responsive to the occlusion flags before processing additional pixels in the first tile responsive to the occlusion flags. The processing may include processing rows of pixels in the row of tiles using a zig-zag traversal algorithm.

In further embodiments of the invention, the occlusion flags are stored in a tile occlusion information cache that is configured to store respective occlusion flags for respective tiles of a row of tiles, respective occlusion threshold depth values for the respective tiles of the row of tiles. Setting occlusion flags comprises determining a maximum depth value for the graphics primitive for a tile, comparing the maximum depth value to the cached occlusion threshold depth value for the tile in the tile occlusion information cache, and setting the occlusion flag for the tile responsive to the comparison.

According to further embodiments, a depth buffer is configured to store respective occlusion threshold depth values for respective pixels of the graphics display field. Setting occlusion flags comprises setting an occlusion flag for a tile to indicate non-occlusion, and processing pixels comprises detecting that the tile has an occlusion flag indicating non-occlusion and responsively processing a pixel for the graphics primitive in the tile without retrieving an occlusion threshold depth value for the pixel from the depth buffer.

The method may further comprise determining a depth value for the graphics primitive for the pixel, comparing the determined depth value for the graphics primitive for the pixel to the occlusion threshold depth value for the tile in the tile occlusion information cache, and updating the occlusion threshold depth value for the tile in the tile occlusion information threshold cache to the determined depth value for the graphics primitive for the pixel responsive to the comparison.

In additional embodiments, setting occlusion flags comprises setting an occlusion flag for a tile to indicate non-occlusion, and processing of pixels is preceded by establishing an aggregate tile occlusion information memory configured to store respective occlusion threshold depth values for all of the rows of tiles, and loading the tile occlusion information cache with occlusion threshold depth values from the aggregate time occlusion information memory. Updating the occlusion threshold depth value for the tile in the tile occlusion information threshold cache is followed by updating threshold occlusion depth values in the aggregate tile occlusion information cache from the tile occlusion information cache.

In still further embodiments of the present invention, occlusion flags are stored in a tile occlusion information cache that is configured to store respective occlusion flags for respective tiles of a row of tiles, respective occlusion threshold depth values for the respective tiles of the row of tiles, and respective status flags for respective tiles of the row of tiles. A first row of pixels somewhere in the row of tiles is processed responsive to the tile occlusion information cache, wherein the processing of the first row of pixels comprises setting occlusion and status flags for at least one tile in the first row of tiles to indicate that occlusion status of at least one tile has been determined. It is then determined whether a next row of pixels is in the first row of tiles. If so, the next row of pixels is processed using information in the tile occlusion cache gained from the first row of pixels. If not, occlusion and status flags information in the tile occlusion information cache are cleared, occlusion threshold depth values in the tile occlusion information cache are updated by writing corresponding occlusion threshold values from the tile occlusion information cache to the aggregate tile occlusion information memory, and then reading occlusion threshold values from the aggregate tile occlusion information memory to the tile occlusion information cache corresponding to the next row of tiles. The next row of pixels is then processed usinig the updated tile occlusion cache.

According to additional aspects of the invention, a plurality of rows of tiles is defined in a graphics display field, each of the tiles comprising a plurality of the pixels. An occlusion flag for a tile is set to indicate non-occlusion for a graphics primitive in the tile. Responsive to detecting that the tile has an occlusion flag indicating non-occlusion, a pixel is processed for a graphics primitive in the tile. The pixel may be processed without retrieving an occlusion threshold depth value for the pixel from a depth buffer, which can reduce the frequency of reading from the depth buffer.

The present invention may be embodied as methods, apparatus and computer program products. For example, the present invention may be advantageously used in a portable electronic device, such as a mobile wireless terminal, personal digital assistant (PDA), or the like.

DETAILED DESCRIPTION OF EMBODIMENTS

Figure 1:
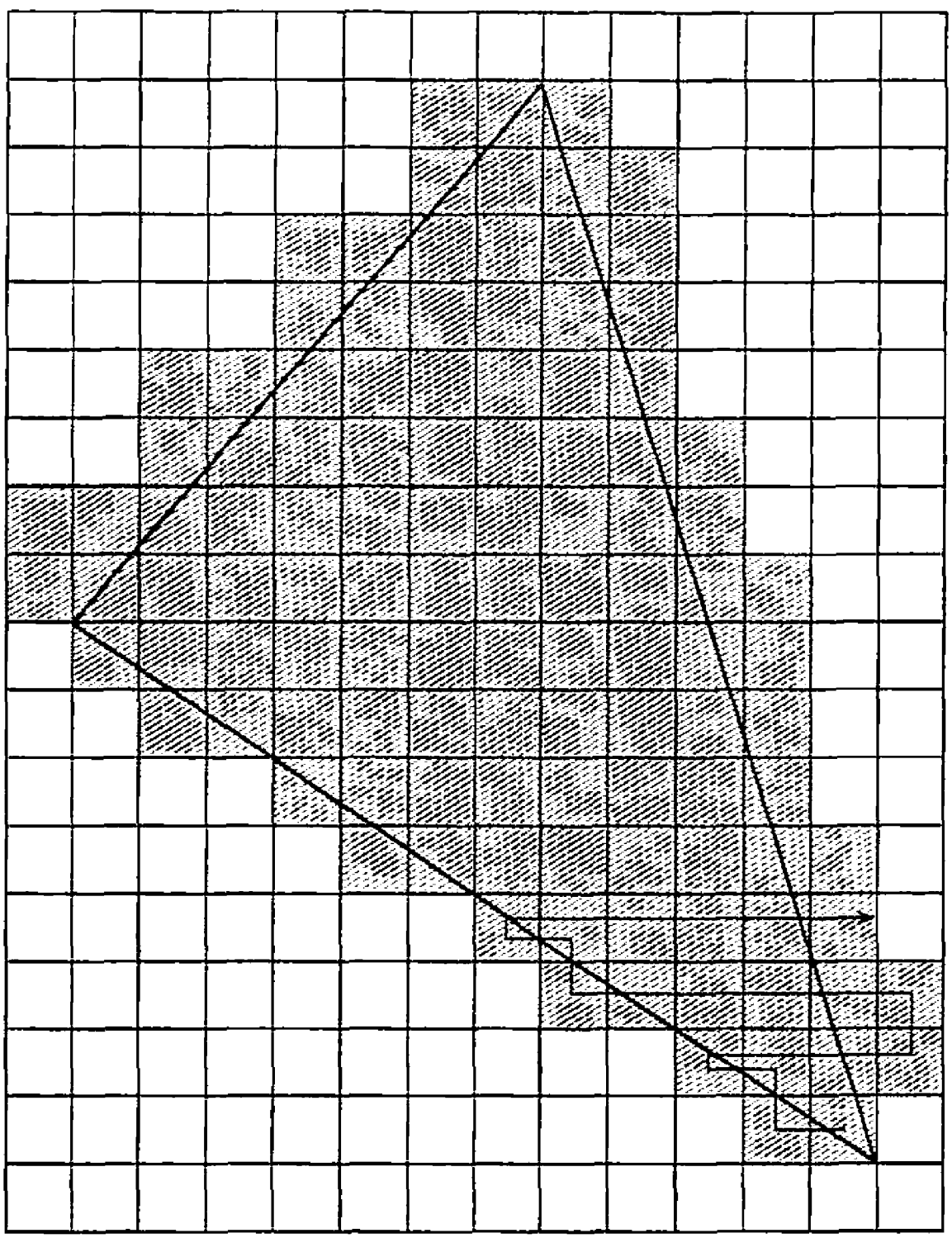
FIG. 1 illustrates a prior art zig-zag traversal technique.

The present invention will now be described more fully with reference to the accompanying drawings, in which exemplary embodiments of the present invention are shown. These embodiments are provided so that this application will be thorough and complete. Like numbers refer to like elements throughout.

Some exemplary embodiments of the present invention described below with reference to FIGS. 2-6 can extend the Pineda zigzag traversal method in three new ways:

1) The z-buffer can be divided into non-overlapping tiles of. e.g., 8×8 pixels.

2) We can have a memory in the system called tileinfo (previously called "aggregate tile occlusion information memory"), where information about the tiles is stored. For each tile, we can store a z-min variable that can hold the minimum value of all the z-values in the tile. For instance, if the screen resolution is 176×144, and the tile size is 8×8, then the number of tiles is 176/8×144/8=22×18=396. Thus tileinfo must be able to hold 396 z-min values, or 396×2=792 bytes, if each z-min value is 2 bytes. To get the address for the z-min of a specific tile, the x- and y-coordinates of the pixel can be used. For instance, in the example above with 176×144 pixels and 8×8 tiles, the address can be calculated as (y/8)*22+x/8, where '/' represents integer division.

3) We can have a cache memory called rowtileinfo (previously called "tile occlusion information cache") that can store information about a row of tiles. Three pieces of information can be stored for each tile in the row, namely:

"z-min-cached", which is a cached version of the z-min available in tileinfo. Just like in an ordinary cache, the value of z-min-cached may be updated without the z-min in tileinfo being updated. After the processing of an entire row of tiles, z-min-cached must be written back to z-min in tileinfo.

"visited", which is a 1-bit status flag; and

"visible" (previously called "non-occlusion flag"), which is also a 1-bit flag.

The cache memory can be big enough to store information about a complete row of tiles. For instance, if the resolution is 176×144, and the tile size is 8×8, then one row of tiles equals 176/8=22 tiles, and rowtileinfo must be able to store "z-min-cached", "visited" and "visible" for 22 tiles. If z-min-cached takes 16 bits, then the entire rowtileinfo can be created using just 22×(16+1+1) bits 396 bits=49.5 bytes. Thus rowtileinfo is much smaller than tileinfo, which means that it can be implemented in hardware on-chip, fast and energy-efficient. Also note that rowtileinfo always holds information about the current row of tiles. Thus, when coming from the last scanline in a tile row to the first scanline of the next tile row, rowtileinfo and tileinfo are updated. To calculate the address for the data in rowtileinfo, we only need the x-coordinate for the pixel. The reason that we can neglect the y-coordinate is that rowtileinfo deals with only one row of tiles. For instance, if all the z-min-cached are stored after each other, we can calculate the address using x/8, where '/' represents integer division.

4) The fourth addition is a z-min based culling algorithm that makes use of the zigzag traversal scheme, the tile structure, the tileinfo memory and the rowtileinfo memory, that saves memory accesses. We will now describe in detail how this algorithm works.

We will describe the algorithm in several steps, where each step will go into more detail than the previous: The first step shows how a triangle is rasterized, the second step shows how a scanline is rasterized, and the third and last step shows how a pixel is rasterized (written to the frame-buffer). However, we will start with describing how the buffers are cleared, since this is typically done at least once per frame before the rasterization of any triangles.

Clearing

Before anything is drawn, the z-buffer memory is generally cleared by setting all the values to a pre-defined value. Usually this pre-defined value is the distance to the far plane, z_far. In our system, we also clear the tileinfo by putting z_far into all the z-min variables. We also clear the rowtileinfo memory. This is done by setting the flag "visited" to "false" for all the tiles in rowtileinfo. Note that we preferably clear the z-buffer and tileinfo once per frame, not between every triangle. Rowtileinfo, however, is cleared every time we go to a new row of tiles, which is treated in more detail below with reference to FIG. 2.

Rasterization of a Triangle

Figure 2:
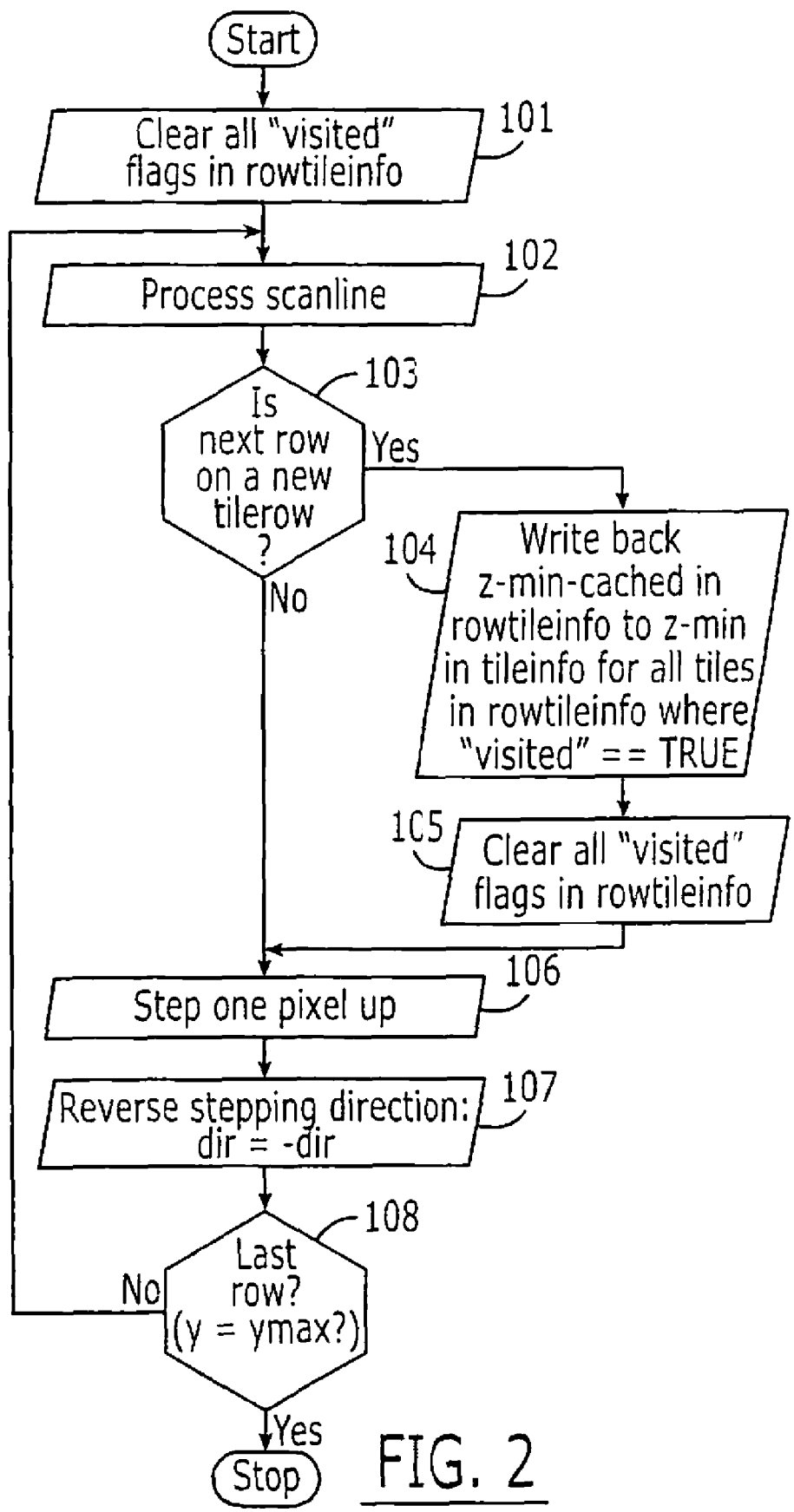
FIGS. 2-8 illustrate exemplary graphics processing operations and apparatus according to some embodiments of the present invention.

According to some embodiments of the invention, rasterization may be done according to FIG. 2, "Processing of a Triangle." First the "visited" flag is set to false in all tiles in rowtileinfo (101). Then we process one scanline (102). How this is done is described in more detail below with reference to FIG. 3. After having processed the scanline, we check if the next row will be in a different tile than the current row. This can be done for instance by checking if (103):

$$(y+1) \bmod \text{tilesize} == 0.$$

where y is the current scanline row, mod is the modulo operator, and tilesize is the tile size in the y-direction. If the next row is on a different tile, then we need to write back the information in rowtileinfo to tileinfo (104). We also want to set all "visited" flags to false (105). This can be done using the following pseudocode:

```
for all tiles in rowtileinfo
{
    if visited == true
    {
        write back z-min-cached to corresponding z-min in tileinfo
    }
    visited = false;
}.
```

After having updated rowtileinfo and tileinfo in the above-mentioned way, we step one pixel up in the y-direction (106). We also reverse the stepping direction in the x-direction (107). We test if we have reached the end of the triangle (108). If so, we stop, otherwise we go back to process a next scanline (102).

Processing of a Scanline

Figure 3:
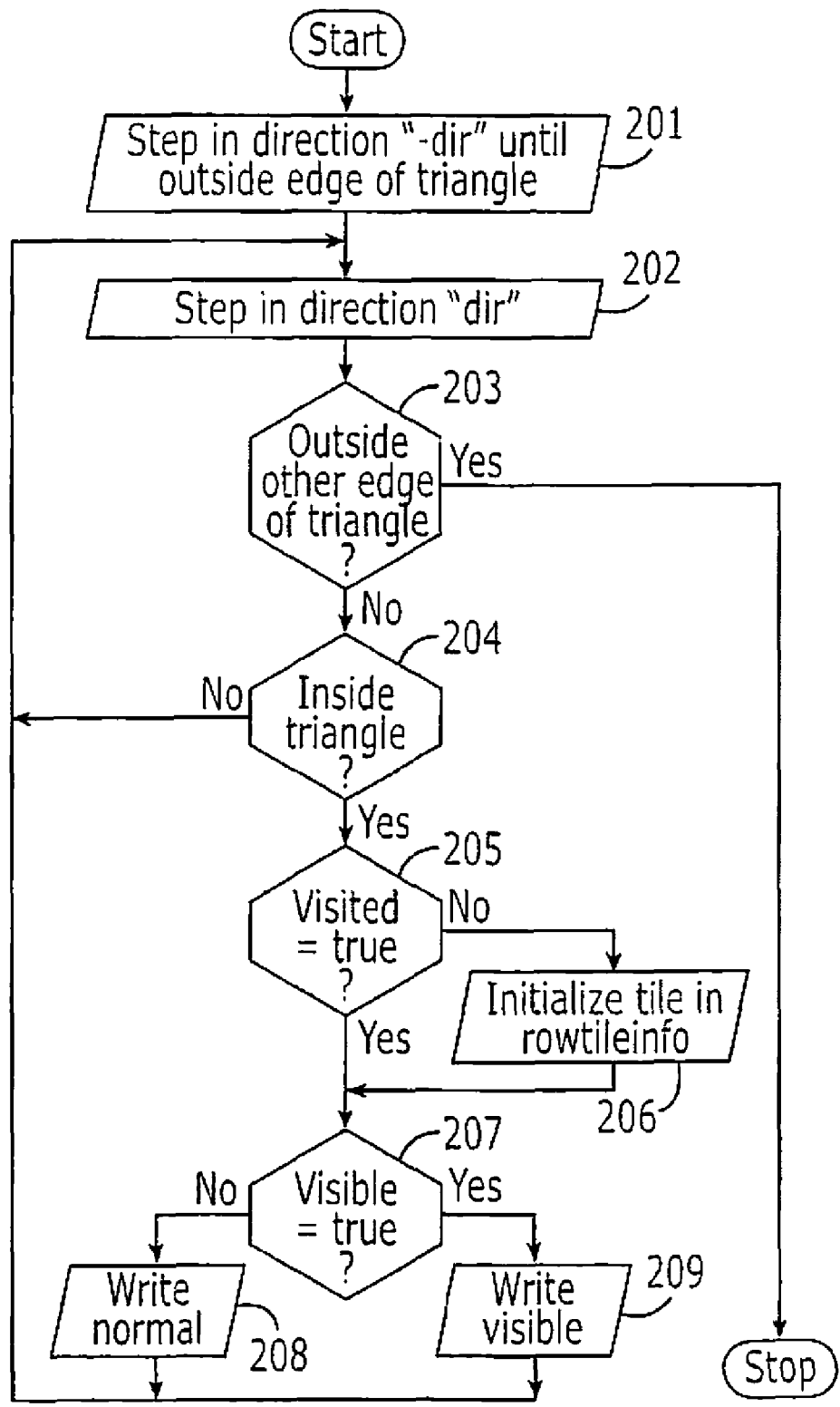

FIG. 3 shows what we should do when we come to a new scanline. First we step in the opposite direction of "dir" until we are outside the edge of the triangle (201) (if we are already outside, we do not need to step at all). Then we step in the direction of "dir" (202) until we are completely outside the triangle (203) on the other side, e.g., say we step to the right—then we need to step to the right until the entire triangle is located to the left of the current position that we test. It may not be sufficient to step just once, since we've just arrived at a new scanline, and may be several pixels outside the triangle. For each step we test if we are inside the triangle (204). If not, we take another step in the direction of "dir" (202). If we are inside, we check the visited flag for the corresponding tile in rowtileinfo (205). If the visited flag is false, we have not yet visited that tile, and we must initialize the information in rowtileinfo for that tile (206). How, this is done is described in detail below with reference to FIG. 4. If the visited flag is true, the information in rowtileinfo is already up to date, and we can use it. Thus, we test if the visible flag is true (207). If it is, we can use a fast way of writing the pixel without the need to read the z-buffer, herein called "write visible" (209), which will be described in more detail below with reference to FIG. 5. If the visited flag is false, we will use the normal way of rasterizing the pixel, herein called "write normal" (208), which is described in detail below with reference to FIG. 6. After this, we go back and step another pixel (202).

Initializing Rowtileinfo for a Tile

Figure 4:
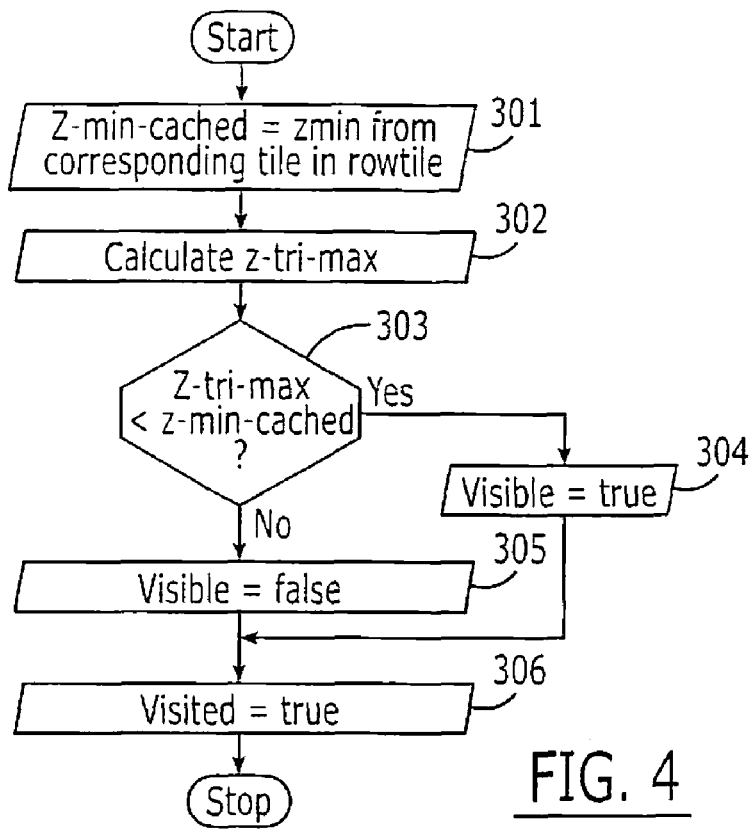

FIG. 4 shows how we initialize rowtileinfo for a tile. We start by reading the z-min value from tileinfo into the z-min-cached value in rowtileinfo (301). After that, we calculate a value called value called z-tri-max, which is larger than or equal to all possible z-values that the triangle can assume in the current tile (302). One way to calculate z-tri-max is to let z-tri-max be the maximum of the z-values of the triangle's vertices. If the coordinates for the triangle vertices are (x_A, y_A, z_A), (x_B, y_B, z_B), (x_C, y_C, z_C), then z-tri-max can be calculated as z-tri-max=max(z_A, max(z_B, z_C)).

Another way is to let z-tri-max be the maximum z-value that the triangle plane can assume in the tile. After having calculated z-tri-max, we then check if z-tri-max<z-min-cached (303). If so, we know for sure that all the pixels of the triangle inside the tile will be visible (non-occluded by a previously rendered primitive), and the flag "visible" is therefore set to true (304). Else, "visible" will be set to false (305). Finally, the "visited"-flag from the corresponding tile in rowtileinfo is set to "true" (306).

"Write Visible"—Writing a Pixel that is Known to be Seen

Figure 5:
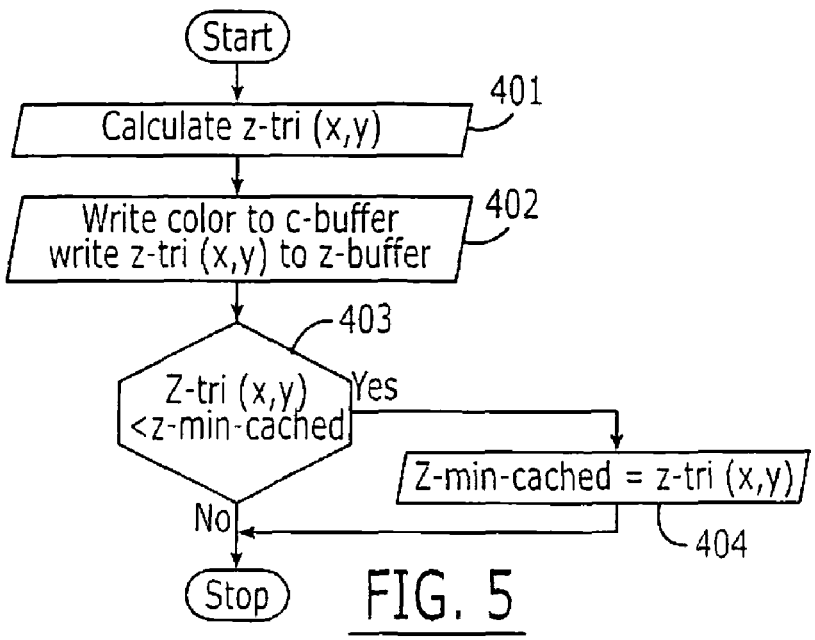

FIG. 5 shows how we should write a pixel if both the "visible" and the "visited" flag are true for the tile in rowtileinfo corresponding to the pixel.

If the "visible" flag is true, we can draw the pixel without reading the z-buffer. The pixel is guaranteed to be visible. However, since we are drawing new pixels, it is possible that we will draw a pixel that has a smaller value than the current z-min-cached. Thus, we should update z-min-cached accordingly. We do this by first calculating z-tri (x,y) (401) and then writing z-tri (x,y) to the z-buffer (depth buffer) and color to the color-buffer (402). Here (x,y) are the coordinates of the processed pixel. Next we check if z-tri (x,y)<z-min-cached (403). If so, we should update z-min-cached (404).

Write Normal—If "visited" is False

Figure 6:
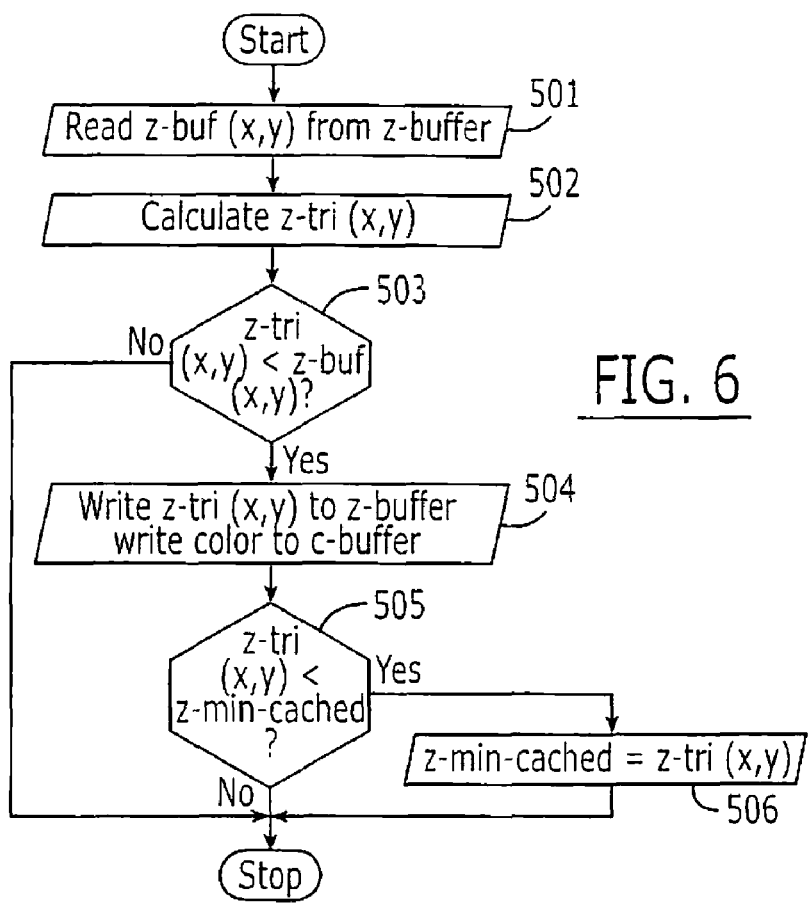

If the "visited" flag is true, but the "visible" flag is false, we should read the z-buffer to know if we should set the color. We also should update z-min-cached in case we happen to write a z-value to the z-buffer that is smaller than z-min-cached. This is done as shown in FIG. 6. First we read z-buf from the z-buffer (501). Then we calculate z-tri (x,y) (502). Next, we check if z-tri (x,y)<z-buf (x,y) (503). If not, the pixel is not visible and we stop. Else, we write z-tri (x,y) to the z-buffer and we write the color to the color-buffer (504). We also check whether z-tri (x,y)<z-min-cached (505). If it is, we should update z-min-cached with z-tri (x,y) (506). Else, we are finished and can stop.

Further Exemplary Embodiments

Figure 7:
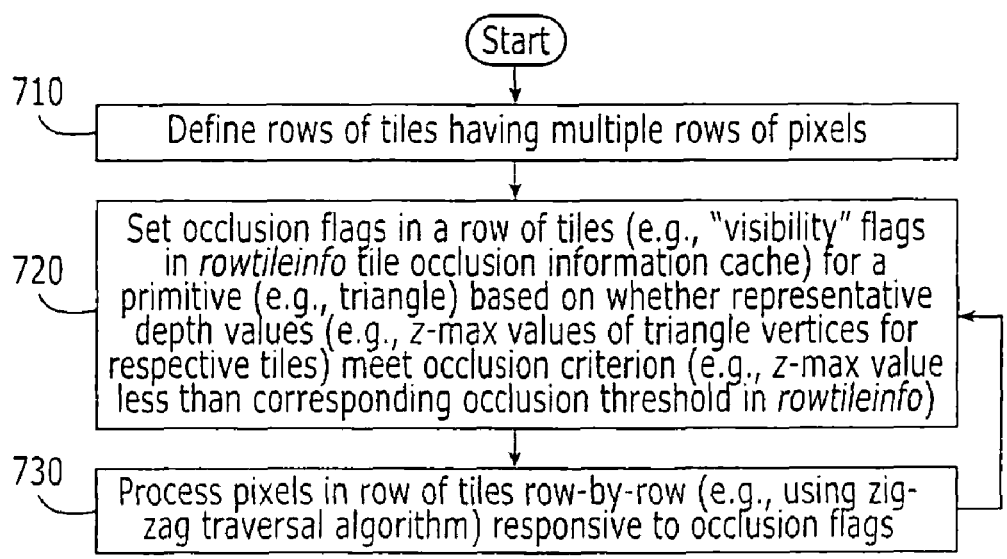

Generalized exemplary graphics processing operations according to some further aspects of the present invention are illustrated in FIG. 7. Rows of tiles are defined in a graphics display field, the tiles including multiple rows of pixels (710). Occlusion flags for tiles in a row of tiles are set. i.e., given a value to indicate non-occlusion or possible occlusion, as described above, for a graphics primitive based on whether representative depth values meet an occlusion criterion (720). For example, an occlusion flag may be a "visibility" flag of a rowtileinfo cache as described above. The flag may be set based on a comparison of, for example, z-max values for a primitive (e.g., a triangle) and a cached occlusion threshold z-value, as described above. Pixels in the row of tiles are processed row by row, e.g., using a zig-zag traversal algorithm as described above, responsive to the occlusion flags (730). It will be understood that not all occlusion flags and/or depth values for the row of tiles need be set before a pixel in the row is processed (e.g., rendered), as it will often be the case that occlusion flags and/or depth values may be updated after one or more pixels in the row are processed, as indicated by the loop back from block 720 to block 730. As described above, the row-by-row processing may result in a partial visitation of some tiles when processing a scanline and revisitation of some or all of these tiles upon subsequent processing of other scanlines, depending, generally, upon the geometry of the primitive.

Figure 8:
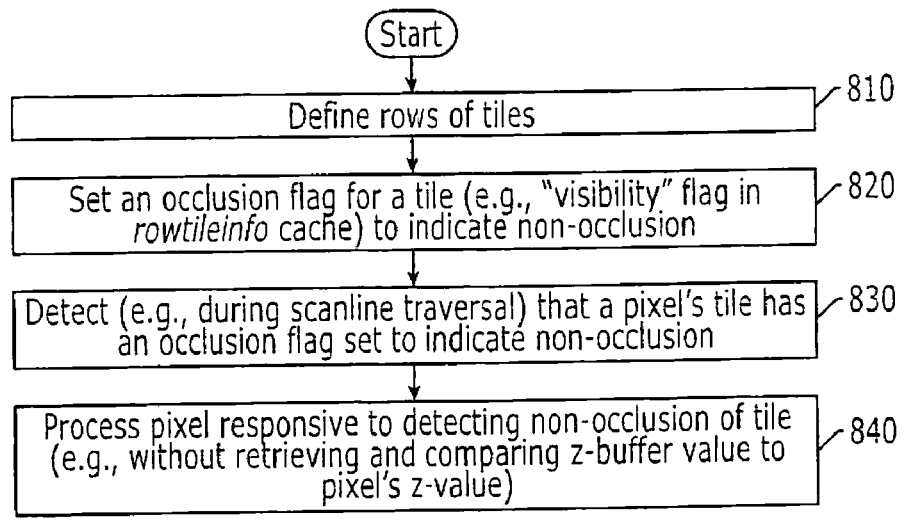

FIG. 8 illustrates further generalized exemplary operations according to additional aspects of the present invention. A plurality of tiles is defined in a graphics display field (810). An occlusion flag, e.g., a "visibility" flag in a rowtileinfo cache, is set to indicate that a graphics primitive is not occluded in a tile (820). Subsequently, e.g., during processing of a pixel in a scanline traversal, it is detected that the tile in which a pixel lies has an occlusion flag indicating non-occlusion (830). The pixel is then processed responsive to detection of the flag's state (840). For example, as discussed in the above embodiments, if the occlusion flag indicates non-occlusion, the color value and z-value for the pixel may simply be written to the color buffer and the z-buffer, respectively, without requiring retrieval of the z-buffer value for the pixel. As explained above, this can result in a reduction of bandwidth-consuming reads from the z-buffer (which may be stored in a slower, off-chip memory) as a frame is processed.

Figure 9:
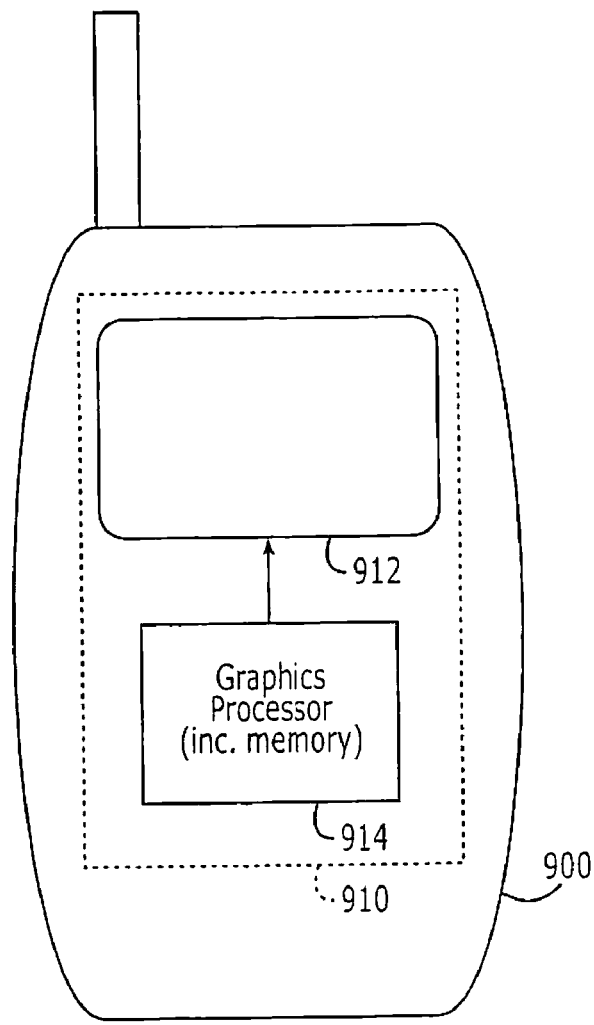
FIG. 9 illustrates an exemplary portable electronic device including graphics apparatus according to further embodiments of the present invention.

FIG. 9 illustrates an exemplary apparatus 910 according to further embodiments of the present invention, in which graphics processing operations, such as the operations described herein with reference to FIGS. 2-8, may be performed. The apparatus 910, here shown as implemented in a portable electronic device 900 (e.g., a mobile wireless terminal, PDA or similar device), includes a display 912 and a graphics processor 914 configured to implement one or all of the graphics processing operations described herein with reference to FIGS. 2-8. The graphics processor 914 may include, for example, a microprocessor chip, a microcontroller chip, a digital signal processor (DSP) chip, a video processor chip, a special-purpose processor implemented in an application-specific integrated circuit (ASIC), and combinations thereof. The graphics processor 914 may also include a memory configured to store computer code and configured to perform the graphics processing operations described herein upon execution in the graphics processor 914. The memory may include, for example, on-chip memory (e.g., cache memory) integrated in a microprocessor. DSP, video processor chip or similar computing device, which can be used to implement a tile occlusion information cache (e.g., rowtileinfo as described above), as well as discrete memory (e.g., DRAM, SRAM, flash memory, and the like) configured to interoperate with such a computing device and which can be used to store larger amounts of data, such as z-buffer and color buffer data for all of the pixels in a display field.

In the present application, FIGS. 2-9 are diagrams illustrating exemplary apparatus and operations according to embodiments of the present invention. It will be understood that operations depicted in the diagrams, and combinations thereof, may be implemented using one or more electronic circuits, for example, in graphics processing circuitry in a portable electronic device, such as a wireless phone, PDA of the like. It will also be appreciated that, in general, operations depicted in the diagrams, and combinations thereof, may be implemented in one or more electronic circuits, such as in one or more discrete electronic components, one or more integrated circuits (ICs), one or more application specific integrated circuits (ASICs), and application specific circuit modules, as well as by computer program instructions which may be executed by a computer or other data processing apparatus, such as a microprocessor or digital signal processor (DSP), to produce a machine such that the instructions which execute on the computer or other programmable data processing apparatus create electronic circuits or other means that implement the specified operations. The computer program instructions may also be executed on one or more computers or other data processing apparatus to cause a series of actions to be performed by the computer(s) or other programmable apparatus to produce a computer implemented process that includes the specified operations.

The computer program instructions may also be embodied in the form of a computer program product in a computer-readable storage medium, i.e., as computer-readable program code embodied in the medium for use by or in connection with an instruction execution system. The computer-readable storage medium may include, but is not limited to, electronic, magnetic, optical or other storage media, such as a magnetic or optical disk or an integrated circuit memory device. For example, the computer program instructions may be embodied in memory included in a device, such as a computer. Accordingly, blocks of the diagrams of FIGS. 2-9 support electronic circuits and other apparatus that perform the specified operations, acts for perfoming the specified operations, and computer program products configured to perform the specified operations.

In the drawings and specification, there have been disclosed exemplary embodiments of the invention. Although specific terms are employed, they are used in a generic and descriptive sense only and not for purposes of limitation.

That which is claimed:

1. A graphics processing method, comprising:
 defining a plurality of rows of tiles in a graphics display field comprising a plurality of rows of pixels, each tile including pixels from at least two rows of pixels;
 setting occlusion flags for respective tiles of a row of tiles for a graphics primitive based on whether respective representative depth values for the tiles of the row of tiles meet an occlusion criterion;
 processing pixels in rows of pixels corresponding to the row of tiles for the graphics primitive in a row-by-row manner responsive to the occlusion flags, wherein the step of processing pixels includes:
  processing a portion of the pixels in a first tile of the row of tiles responsive to the occlusion flags;
  processing pixels in a second tile of the row of tiles responsive to the occlusion flags after processing the portion of pixels in the first tile; and
  returning to the first tile to process additional pixels in the first tile responsive to the occlusion flags after processing the pixels in the second tile; and
 utilizing results of the graphics processing to display enhanced graphics on an electronic display.

2. The method according to claim 1, wherein the occlusion flags are stored in a tile occlusion information cache that is configured to store respective occlusion flags for respective tiles of a row of tiles and respective occlusion threshold depth values for the respective tiles of the row of tiles, and wherein the step of setting occlusion flags includes:
 determining a maximum depth value for the graphics primitive within a tile;
 comparing the maximum depth value to the cached occlusion threshold depth value for the tile in the tile occlusion information cache; and
 setting the occlusion flag for the tile responsive to the comparison.

3. The method according to claim 1, further comprising:
 establishing a depth buffer configured to store respective occlusion threshold depth values for respective pixels of the graphics display field; and
 wherein setting the occlusion flags comprises setting an occlusion flag for a tile to indicate non-occlusion; and
 wherein processing pixels comprises:
  detecting that the tile has a occlusion flag indicating non-occlusion; and
  responsively processing a pixel for the graphics primitive in the tile without retrieving an occlusion threshold depth value for the pixel from the depth buffer.

4. The method according to claim 3, further comprising establishing a color buffer configured to store respective color values for respective ones of the pixels of the graphics display field, and wherein responsively processing a pixel for the graphics primitive in the tile without retrieving an occlusion threshold depth value for the pixel from the depth buffer comprises responsively storing a color value and a depth value for the graphics primitive for the pixel in the color buffer and the depth buffer, respectively.

5. The method according to claim 1, wherein the occlusion flags are stored in a tile occlusion information cache that is configured to store respective occlusion flags for respective tiles of a row of tiles, respective occlusion threshold depth values for the respective tiles of the row of tiles, and wherein the method further comprises:
 determining a depth value for the graphics primitive for the pixel;
 comparing the determined depth value for the graphics primitive for the pixel to the occlusion threshold depth value for the tile in the tile occlusion information cache; and
 updating the occlusion threshold depth value for the tile in the tile occlusion information threshold cache to the determined depth value for the graphics primitive for the pixel responsive to the comparison.

6. The method according to claim 5, wherein setting occlusion flags comprises setting an occlusion flag for a tile to indicate non-occlusion, and wherein processing pixels is preceded by:
 establishing an aggregate tile occlusion information memory configured to store respective occlusion threshold depth values for all of the rows of tiles; and
 loading the tile occlusion information cache with occlusion threshold depth values from the aggregate time occlusion information memory; and
 wherein updating the occlusion threshold depth value for the tile in the tile occlusion information threshold cache is followed by updating threshold occlusion depth values in the aggregate tile occlusion information memory from the tile occlusion information cache.

7. An apparatus, comprising:
 a display; and a graphics processor coupled to the display for providing enhanced graphics to the display, said graphics processor comprising:
  means for defining a plurality of rows of tiles in a graphics display field comprising a plurality of rows of pixels, each tile including pixels from at least two rows of pixels;
  means for setting occlusion flags for respective tiles of a row of tiles for a graphics primitive based on whether respective representative depth values for the tiles of the row of tiles meet an occlusion criterion; and
  means for processing pixels in rows of pixels corresponding to the row of tiles for the graphics primitive in a row-by-row manner responsive to the occlusion flags, wherein the means for processing pixels includes:
    means for processing a portion of the pixels in a first tile of the row of tiles responsive to the occlusion flags; and
    means for processing pixels in a second tile of the row of tiles responsive to the occlusion flags after processing the portion of pixels in the first tile; and
    means for returning to the first tile to process additional pixels in the first tile responsive to the occlusion flags after processing the pixels in the second tile; and
  means for sending results of the graphics processing to the display.

8. The apparatus according to claim 7, further comprising a tile occlusion information cache for storing the occlusion flags, the tile occlusion information cache being configured to store respective occlusion flags for respective tiles of a row of tiles and respective occlusion threshold depth values for the respective tiles of the row of tiles; and
  wherein the means for setting occlusion flags includes:
    means for determining a maximum depth value for the graphics primitive within a tile;
    means for comparing the maximum depth value to the cached occlusion threshold depth value for the tile in the tile occlusion information cache; and
    means for setting the occlusion flag for the tile responsive to the comparison.

9. The apparatus according to claim 8, further comprising a depth buffer configured to store respective occlusion threshold depth values for respective pixels of a graphics display field of the display, wherein the graphics processor is operative to maintain and to process the pixel without retrieving an occlusion threshold depth value from the depth buffer.

10. The apparatus according to claim 7, wherein the display and the graphics processor are housed in a portable electronic device.

11. A computer program product comprising program code embodied in a computer-readable storage medium, the program code comprising program code configured to cause a graphics processor to:
  define a plurality of rows of tiles in a graphics display field comprising a plurality of rows of pixels, each tile including pixels from at least two rows of pixels;
  set occlusion flags for respective tiles of a row of tiles for a graphics primitive based on whether respective representative depth values for the tiles of the row of tiles meet an occlusion criterion;
  process pixels in rows of pixels corresponding to the row of tiles for the graphics primitive in a row-by-row manner responsive to the occlusion flags, wherein the pixel processing includes:
    processing a portion of the pixels in a first tile of the row of tiles responsive to the occlusion flags;
    processing pixels in a second tile of the row of tiles responsive to the occlusion flags after processing the portion of pixels in the first tile; and
    returning to the first tile to process additional pixels in the first tile responsive to the occlusion flags after processing the pixels in the second tile; and
  wherein the graphics processor utilizes results of the graphics processing to display enhanced graphics on an electronic display.

12. The computer program product according to claim 11, wherein the occlusion flags are stored in a tile occlusion information cache that is configured to store respective occlusion flags for respective tiles of a row of tiles and respective occlusion threshold depth values for the respective tiles of the row of tiles, and wherein the setting of occlusion flags includes:
  determining a maximum depth value for the graphics primitive within a tile;
  comparing the maximum depth value to the cached occlusion threshold depth value for the tile in the tile occlusion information cache; and
  setting the occlusion flag for the tile responsive to the comparison.

13. The computer program product according to claim 12, wherein the program code is further configured to maintain a depth buffer configured to store respective occlusion threshold depth values for respective pixels of a graphics display field of the display and to process the pixel without retrieving an occlusion threshold depth value from the depth buffer.

* * * * *